United States Patent
Zhang et al.

(12)

(10) Patent No.: US 12,065,040 B2
(45) Date of Patent: Aug. 20, 2024

(54) TESTING PLATFORM AND METHOD FOR EVACUATED TUBE HIGH-TEMPERATURE SUPERCONDUCTING MAGNETIC LEVITATRION (HTS MAGLEV) UNDER HIGH-SPEED OPERATION STATE

(71) Applicant: Southwest Jiaotong University, Chengdu (CN)

(72) Inventors: Weihua Zhang, Chengdu (CN); Zigang Deng, Chengdu (CN); Wenxiang Zhou, Chengdu (CN); Haiquan Bi, Chengdu (CN); Yuanbo Wang, Chengdu (CN); Qiwen Ma, Chengdu (CN); Le Liang, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/483,477

(22) Filed: Oct. 9, 2023

(65) Prior Publication Data
US 2024/0157807 A1 May 16, 2024

Related U.S. Application Data

(63) Continuation of application No. PCT/CN2023/106729, filed on Jul. 11, 2023.

(30) Foreign Application Priority Data

Oct. 27, 2022 (CN) .......................... 202211325194.3

(51) Int. Cl.
*B60L 13/10* (2006.01)
(52) U.S. Cl.
CPC ........... *B60L 13/10* (2013.01); *B60L 2200/26* (2013.01)

(58) Field of Classification Search
CPC ........................... B60L 13/10; B60L 2200/26
See application file for complete search history.

(56) References Cited

U.S. PATENT DOCUMENTS

| 6,972,115 B1 * | 12/2005 | Ballard | B22F 9/14 |
| | | | 422/186.04 |
| 2006/0076225 A1 * | 4/2006 | Lah | C10B 33/006 |
| | | | 202/245 |

(Continued)

FOREIGN PATENT DOCUMENTS

| CN | 2173981 Y | 8/1994 |
| CN | 103129843 A | 6/2013 |

(Continued)

OTHER PUBLICATIONS

Yin Chen et al., "Analyzing and Designing a New Kind of Eddy Current Braking Device Used in High Speed Maglev in Vacuum Pipeline", Proceedings of the CSEE, Mar. 5, 2020, vol. 40, No. 5, pp. 1683-1694.

(Continued)

*Primary Examiner* — Jermele M Hollington
*Assistant Examiner* — Zannatul Ferdous

(57) ABSTRACT

A testing platform for evacuated tube high-temperature superconducting magnetic levitation (HTS maglev) under a high-speed operation state, including an evacuated tube, a supporting platform assembly, a model train and a gantry. The supporting platform assembly is arranged in the evacuated tube, and is provided with a permanent magnet track and a stator winding. A mover and a cryogenic dewar are arranged at a bottom of the model train, and multiple superconducting bulks are arranged in the cryogenic dewar. A side wall of the model train is made of a metal material. The gantry is arranged on the supporting platform assembly, and permanent magnets are arranged on upright posts of the (Continued)

gantry. A testing method using the testing platform is also provided.

10 Claims, 2 Drawing Sheets

(56) References Cited

U.S. PATENT DOCUMENTS

| | | | |
|---|---|---|---|
| 2006/0204997 A1* | 9/2006 | Macioszek | G01N 35/026 435/6.15 |
| 2007/0052304 A1 | 3/2007 | Masson | |
| 2011/0074231 A1 | 3/2011 | Soderberg | |
| 2017/0279381 A1 | 9/2017 | Adams | |
| 2019/0319554 A1* | 10/2019 | Adams | H02K 55/00 |

FOREIGN PATENT DOCUMENTS

| | | |
|---|---|---|
| CN | 105172803 A | 12/2015 |
| CN | 106828184 A | 6/2017 |
| CN | 106926743 A | 7/2017 |
| CN | 108297893 A | 7/2018 |
| CN | 108501963 A | 9/2018 |
| CN | 208422245 U | 1/2019 |
| CN | 110588360 A | 12/2019 |
| CN | 110979019 A | 4/2020 |
| CN | 111081124 A | 4/2020 |
| CN | 111086396 A | 5/2020 |
| CN | 111141536 A | 5/2020 |
| CN | 211207766 U | 8/2020 |
| CN | 111845367 A | 10/2020 |
| CN | 111964904 A | 11/2020 |
| CN | 112240834 A | 1/2021 |
| CN | 114823040 A | 7/2022 |
| CN | 114834255 A | 8/2022 |
| CN | 217155862 U | 8/2022 |
| CN | 115389232 A | 11/2022 |
| JP | H10129471 A | 5/1998 |

OTHER PUBLICATIONS

Chenhao Zhang, "Design and Implementation of Magnetic Levitation System Experiment Platform Based on Semi-physical Simulation", Full-text Database of Chinese Excellent Master's degree Theses. China Academic Journals (Optical Disc Edition) Electronic Magazine, 2021, No. 7, pp.

Xiangdong Liu et al., "An Overview on Research Progress of Coreless Stator Axial Flux Permanent Magnet Synchronous Motor", Proceedings of the CSEE, Jan. 5, 2020, vol. 40, No. 1, pp. 257-273, 392.

Mxiang Yuan et al., "On analytical method of permanent magnet eddy currentbrake for high speed EMU", Modern Urban Transit, 2020, No. 11, pp. 105-109.

* cited by examiner

TESTING PLATFORM AND METHOD FOR EVACUATED TUBE HIGH-TEMPERATURE SUPERCONDUCTING MAGNETIC LEVITATRION (HTS MAGLEV) UNDER HIGH-SPEED OPERATION STATE

CROSS-REFERENCE TO RELATED APPLICATIONS

This application is a continuation of International Patent Application No. PCT/CN2023/106729, filed on Jul. 11, 2023, which claims the benefit of priority from Chinese Patent Application No. 202211325194.3, filed on Oct. 27, 2022. The content of the aforementioned application, including any intervening amendments thereto, is incorporated herein by reference in its entirety.

TECHNICAL FIELD

The present disclosure relates to magnetic levitation (maglev), and more particularly to a testing platform and method for evacuated tube high-temperature superconducting (HTS) maglev under a high-speed operation state.

BACKGROUND

The current researches on HTS maglev mainly focuses on the levitation force, guidance force and corresponding dynamic behaviors under a quasi-static state, and the relevant experimental equipment is mainly applied to the levitation performance test of single or multiple superconducting bulks. There is still a lack of a corresponding platform for the researches on the dynamic characteristics of a HTS maglev train under a high-speed operation state. With the emergence of the HTS maglev high-speed engineering prototype, there is an urgent need for a system for experimental researches on the dynamic behavior of superconducting maglev trains at high and ultra-high speeds, so as to obtain relevant experimental data to promote the development and application.

SUMMARY

An object of this application is to provide a testing platform and method for evacuated tube HTS maglev under a high-speed operation state to overcome the above problems.

Technical solutions of this application will be specifically described as follows.

In the first aspect, the present disclosure provides a testing platform for evacuated tube HTS maglev under a high-speed operation state, comprising:
an evacuated tube;
a supporting platform assembly;
a model train; and
a gantry frame;
wherein one end of the evacuated tube is closed, and the other end of the evacuated tube is provided with an isolation door; the supporting platform assembly is arranged in the evacuated tube; a permanent magnet track and a stator winding are arranged on the supporting platform assembly; and the permanent magnet track is configured for researches of dynamic characteristics of a train passing another train running in opposite direction; a mover and a cryogenic dewar are arranged at a bottom of the model train, a plurality of superconducting bulks are provided in the cryogenic dewar; the stator winding and the mover are configured to be energized and coupled to generate a driving force to propel the model train forward; the plurality of superconducting bulks are configured to cooperate with the permanent magnet track to generate a levitation force; and a side wall of the model train is made of a metal material; the gantry is arranged on the supporting platform assembly; a permanent magnet is arranged on an upright post of the gantry; and the permanent magnet is configured to be coupled with the model train to form an eddy current on a body of the model train.

In the second aspect, the present disclosure provides a testing method for evacuated tube HTS maglev using the testing platform, comprising:
placing a field-cooling plate of a preset thickness below the cryogenic dewar of the model train;
closing the isolation door, and vacuumizing the evacuated tube;
removing the field-cooling plate, and levitating the model train is suspended on the permanent magnet track;
energizing the mover, such that under the action of electromagnetic force, the mover pushes the model train to accelerate in the evacuated tube; and
when the model train arrives at an area where the gantry is located, generating, by the permanent magnet, an eddy current on the body of the model train to decelerate the model train.

The beneficial effects of the present disclosure are described as follows.

The testing platform provided herein includes an evacuated tube, a supporting platform assembly, a model train and a gantry, and the model train can be accelerated to 400 km/h and above through bilateral linear motors, such that researches on levitation and guidance performance of the HTS maglev under a high-speed state can be conducted. Moreover, based on the testing platform provided herein, researches on the HTS maglev vehicle-rail coupling mechanism and dynamic stability, the magnetic-electric-force-air multi-physical field dynamic coupling mechanism and model research between the HTS maglev vehicle and rails, the dynamic characteristics of a train passing another train in opposite direction on parallel tracks, and the suspension, guidance and aerodynamic characteristics of the HTS maglev vehicle under a low-pressure environment.

Other features and advantages of the present disclosure will be described below, and partly become apparent from the description or are understood based on the embodiments of the present disclosure. The objects and other advantages of the present disclosure may be realized and obtained by means of the structure specifically indicated in the description, claims and drawings.

DESCRIPTION OF THE DRAWINGS

In order to illustrate the technical solutions of the embodiments of the present disclosure more clearly, the accompanying drawings used in the embodiments will be briefly introduced below. It should be understood that presented in the drawings are merely some embodiments of the present disclosure, and are not intended to limit the scope of the disclosure. For those skilled in the art, other relevant drawings can also be obtained from these drawings without making creative effort.

Figure 1:
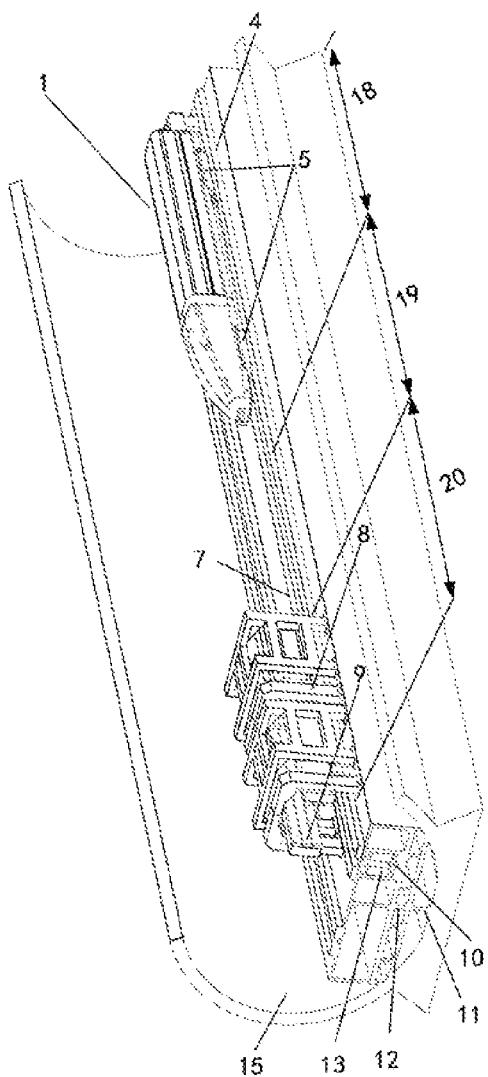
FIG. 1 is a structural diagram of a testing platform for evacuated tube HTS maglev under a high-speed operation state according to Embodiment 1 of the present disclosure.

In the drawings: 1, model train; 3, mover; 4, base; 5, cryogenic dewar; 7, permanent magnet track; 8, gantry; 9, permanent magnet; 10, V-shaped groove; 11, supporting structure; 12, bearing platform; 13, stator winding; 15, evacuated tube; 16, stator mounting frame; 18, acceleration section; 19, deceleration section; and 20, eddy-current braking section.

DETAILED DESCRIPTION OF EMBODIMENTS

In order to more clearly illustrate the objects, technical solutions and advantages of the embodiments of this application, the technical solutions in the embodiments of this application will be clearly and completely described below with reference to the drawings in the embodiments of this application. It is obvious that the described embodiments are only some embodiments of this application, rather than all embodiments. The components of embodiments illustrated in accompanying drawings herein can be arranged and designed with a variety of configurations. Therefore, the following detailed description of embodiments in the accompanying drawings is not intended to limit the scope of the disclosure, but merely illustrates selected embodiments of this application. Based on the embodiments of the present disclosure, all other embodiments obtained by those skilled in the art without making creative work shall fall within the scope of this application.

It should be noted that similar labels and letters indicate similar items in the following drawings. Therefore, once an item has been defined in a drawing, there is no need to further define and explain it in the subsequent drawings. Meanwhile, in the description of this application, the terms "first" and "second" are only used for distinguishment, and cannot be understood as indicating or implying relative importance.

As shown in FIG. 1, this embodiment provides a testing platform for evacuated tube HTS maglev under a high-speed operation state.

Figure 2:
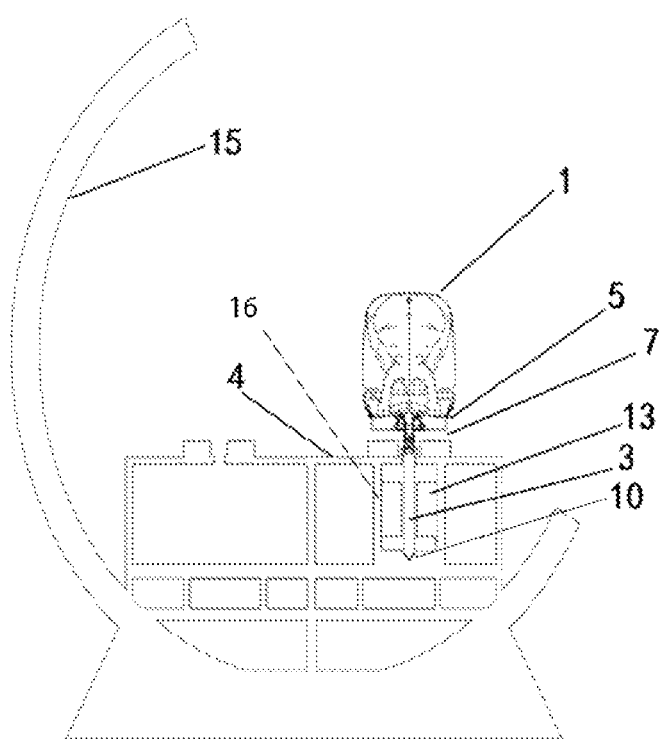
FIG. 2 is a cross-sectional view of the testing platform according to Embodiment 1 of the present disclosure.

Referring to FIGS. 1-2, the testing platform includes an evacuated tube 15 (the drawings merely illustrate a part of the evacuated tube), a supporting platform assembly, a model train 1 and a gantry 8. It should be noted that this application also concludes a vacuum system (not shown in the figure) used with the evacuated tube 15. The specific structure of the vacuum system can be a combination of a molecular pump and a mechanical pump in the prior art, so the vacuumization process will not be repeated herein. Specifically, in this application, one end of the evacuated tube 15 is closed, and the other end of the evacuated tube 15 is provided with an isolation door (not shown in the figure). The inspection and maintenance of the model train 1 is realized by controlling the opening and closing of the isolation door.

In an embodiment, the support platform is arranged in the evacuated tube 15, the permanent magnet track 7 and the stator winding 13 are arranged on the support platform. It should be noted that the stator winding 13 includes a stator core and a coil electrically connected to an energy supply equipment. A bottom of the model train 1 provides a mover 3 and a cryogenic dewar 5. The mover 3 is also electrically connected to the energy supply equipment. The cryogenic dewar 5 is fixedly connected to the bogie of the model train 1. Multiple superconducting bulks are arranged in the cryogenic dewar 5. The stator winding 13 and the mover 3 are configured to be energized and coupled to generate a driving force to propel the model train forward. The superconducting bulks are configured to cooperate with the permanent magnet track 7 to generate a levitation force, and a side wall of the model train 1 is made of a metal material. The gantry 8 is arranged on the supporting platform assembly. A permanent magnet 9 is arranged on an upright post of the gantry 8. The permanent magnet 9 is coupled with the body of the model train 1 to form an eddy current on the body of the model train 1. Specifically, a cavity formed by the gantry 8, the permanent magnet 9, and the support platform is configured for the model train 1 to pass through.

In an embodiment, the projected area of the permanent magnet on the side wall of the modal car 1 accounts for more than 30% of the sidewall of the model train 1. In other words, the percentage of the projected area of the permanent magnet on the sidewall of the model train 1 in the area of the sidewall of the model train 1 is greater than or equal to 30%. In this application, the evacuated tube 15 is configured to provide a low vacuum environment for HTS maglev trains to reduce the resistance of the train during operation and to improve the levitation performance of the magnetic levitation system, which enables researchers to study the levitation and guiding performance of the HTS maglev under a speed of 400 km/h and above. Since the evacuated tube 15 reduces the interference factor of the outside air, the mechanism of HTS maglev on vehicle-rail coupling action mechanism and dynamic stability. The dynamic coupling mechanism of the HTS maglev vehicle-rail-pipeline magnetic-electric-force-air multi-physical field and the suspension, guidance and aerodynamic characteristics of the HTS maglev vehicle under low air pressure environment can be explored by controlling vacuum degree.

In an embodiment, an eddy-current braking system is formed by the permanent magnet 9 on the gantry 8 and a sidewall of the model train 1, which provides a shorter braking distance and produces a greater braking effect compared to the prior art. The eddy-current braking system can effectively utilize the existing structure of the model train 1 without the need for further customization of the bogie required for eddy current braking, which can reduce the customization cost. Moreover, in this application, when the permanent magnet 9 is fixed directly above the column of the gantry 8, the magnetic flux of the permanent magnet 9 can be effectively controlled according to the speed of the final test of the model train 1. The braking of the model train 1 can be effectively carried out above the speed of 400 km/h to ensure the safety of the whole experimental device.

In an embodiment, in this application the evacuated tube 15 is further divided into three regions. A first region is an acceleration section 18. A second region is a deceleration section 19. A third region is an eddy current braking section 20. By dividing the regions within the evacuated tube 15 as described above, the experimental process can be effectively scheduled.

Further, in this application, in order to make the model train 1 reach a speed of 400 km/h, two stator windings 13 are provided. The supporting platform includes a supporting structure 11, a bearing platform 12, and a stator mounting frame 16. The supporting structure 11 is fixed to a bottom of the evacuated tube 15. The bearing platform 12 is horizontally arranged on the supporting structure 11. The stator mounting frame 16 is U-shaped setup, and the horizontal portion of the stator mounting frame 16 is fixedly connected to the bearing platform 12. Two stator windings 13 are arranged on an inner sidewall of the stator mounting frame 16. The mover 3 is arranged between the two stator windings 13. In this way, when the stator windings 13 on both sides are energized simultaneously, the mover 3 located therebetween will be subjected to more alternating repulsion and attraction forces. Moreover, the mover 3 is arranged on a symmetrical axis of the stator mounting frame 16 in order to balance forces in the horizontal direction. A length of the stator winding 13 in the vertical direction is greater than a width of the model train 1. The above-described setting method can provide a large overlapping area for the stator winding 13 and the mover 3 in the vertical direction, and provide a greater speed for the mover 3.

In an embodiment, in order to obtain relevant operating data of the model train 1, in this embodiment, a position detection device (not shown in the drawings) is provided on the stator mounting frame 16 at a specific location on a vertical portion of the stator mounting frame 16. The installation thereof above or below the stator winding 13 is acceptable, and no specific limitation is made herein. Specifically, the position detecting device may be a laser rangefinder.

In an embodiment, protrusions arranged in a preset pattern are provided at a height corresponding to the mover 3 to exclude the effects of high speed. For example, a first group of protrusions are all arranged at different spacings; a second group of protrusions are all arranged at the same spacing; and a third group of protrusions are all arranged at different spacings. And the spacing used in the first group is smaller than the spacing used in the third group. Through the above implementation process, in detecting distance signals, distance changes with different periods caused by the first group of protrusions first occur; distance changes with relatively stable periods occur in the second group, and distance changes with different periods occur finally. The last distance change period is longer than the first one. So that equipment errors of equipment in high-speed operation are eliminated in turn, and the movement of the model train 1 in the whole test process is indirectly located.

Meanwhile, a V-shaped groove 10 is arranged at a bottom of an inner side of the stator mounting frame 16. A section of the mover 3 near a bottom of the stator mounting frame 16 is set in a V-shape matching the V-shaped groove 10. A V-shaped section of the mover 3 extends into the V-shaped groove 10. A symmetrical axis of the V-shaped groove 10 coincides with the symmetrical axis of the stator mounting frame 16. In this application, the normal force of the linear motor is suppressed by the V-shaped groove under the mover 3. During the movement of the model train 1, the traveling wave magnetic field generated by the stator can generate not only a driving force along the moving direction, but also a normal force perpendicular to the direction of movement. If there is no constraint of the V-shaped groove 10, then the mover 3 will have a side collision. In this application, the side collision is prevented by the V-shaped groove 10.

In an embodiment of this application, the supporting platform assembly also includes a base 4. The base 4 is arranged on a top of stator mounting frame 16, and cover the stator mounting frame 16. The base 4 is provided with an opening for the mover 3 to pass through, and a symmetrical axis of the opening coincides with the symmetrical axis of the stator mounting frame 16. The two rails of the permanent magnet track 7 are respectively arranged on both sides of the opening, and are arranged parallel to the opening. Meanwhile, magnetic influences produced by other parts of this application on the permanent magnet track 7 is further reduced. In this application, the base 4 is made of a stainless steel material. A magnetic isolation base is also arranged between the permanent magnet track 7 and the base 4. The magnetic isolation base is bolted to the permanent magnetic track 7 and the magnetic isolation base, and the permanent magnetic track is bolted to the stainless steel base 4.

Moreover, in order to further enhance the safety of the model train 1 and to make the model train 1 decelerate from above 400 km/h to zero as soon as possible, the permanent magnet 9 is preferably configured in a strip shape, and a length of the permanent magnet 9 is greater than a length of the model train 1. Specifically, the permanent magnet 9 may be formed by combination of a plurality of small permanent magnet units, which is not specifically limited in this application. Simultaneously, in order to achieve the force balance on both sides of the model train 1, two permanent magnets 9 are provided, and they are arranged on two inner sides of the gantry 8, respectively.

Embodiment 2

This application further provides a testing method using the testing platform of Embodiment 1, which is performed as follows.

(S1) A field-cooling plate with a preset thickness is placed below the cryogenic dewar 5 of the model train 1.

(S2) The isolation door is closed, and the evacuated tube 15 is vacuumized to a preset pressure.

(S3) The field-cooling plate is removed, and the model train 1 is suspended on the permanent magnet track 7.

(S4) The mover 3 is energized, such that under the action of electromagnetic force, the mover 3 pushes the model train 1 to accelerate in the evacuated tube 15.

(S5) When the model train 1 arrives at an area where the gantry 8 is located, an eddy current will be generated by the permanent magnet 9 on the body of the model train 1 to achieve the deceleration.

Described above are only preferred embodiments of the present disclosure, and are not intended to limit this disclosure. It should be understood that though the disclosure has been described in detail above, various modifications, replacements and changes can still be made by those skilled in the art. Those modifications, equivalent replacements, and improvements made without departing from the spirit of the present disclosure shall be still included within the scope of this disclosure defined by appended claims.

What is claimed is:

1. A testing platform for evacuated tube high-temperature superconducting magnetic levitation (HTS maglev), comprising:
   an evacuated tube;
   a supporting platform assembly;
   a model train; and
   a gantry;
   wherein one end of the evacuated tube is closed, and the other end of the evacuated tube is provided with an isolation door;
   the supporting platform assembly is arranged in the evacuated tube; a permanent magnet track and a stator winding are arranged on the supporting platform assembly; and the permanent magnet track is configured for researches of dynamic characteristics of a train passing another train running in opposite direction;
   a mover and a cryogenic dewar are arranged at a bottom of the model train; a plurality of superconducting bulks are provided in the cryogenic dewar; the stator winding and the mover are configured to be energized and coupled to generate a driving force to propel the model train forward; the plurality of superconducting bulks are configured to cooperate with the permanent magnet track to generate a levitation force; and a side wall of the model train is made of a metal material;

the gantry is arranged on the supporting platform assembly; a permanent magnet is arranged on an upright post of the gantry; and the permanent magnet is configured to be coupled with the model train to form an eddy current on a body of the model train; and the number of the stator winding is two, and the mover is arranged between two stator windings.

2. The testing platform of claim 1, wherein the supporting platform assembly comprises a supporting structure, a bearing platform and a stator mounting frame; the supporting structure is fixed at a bottom of the evacuated tube; the bearing platform is horizontally arranged on the supporting structure; the stator mounting frame is U-shaped; a horizontal part of the stator mounting frame is fixedly connected with the bearing platform; and the two stator windings are respectively arranged on two inner side walls of the stator mounting frame.

3. The testing platform of claim 2, wherein a V-shaped groove is arranged at an inner bottom of the stator mounting frame; a section of the mover near a bottom of the stator mounting frame is configured in a V-shaped structure matching the V-shaped groove; and a V-shaped section of the mover is configured to extend into the V-shaped groove.

4. The testing platform of claim 2, wherein the mover is arranged on a symmetrical axis of the stator mounting frame.

5. The testing platform of claim 3, wherein a symmetrical axis of the V-shaped groove coincides with a symmetrical axis of the stator mounting frame.

6. The testing platform of claim 2, wherein the supporting platform assembly also comprises a base; the base is arranged on a top of stator mounting frame, and is configured to cover the stator mounting frame; the base is provided with an opening for the mover to pass through, and a symmetrical axis of the opening coincides with a symmetrical axis of the stator mounting frame; two rails of the permanent magnet track are respectively arranged on both sides of the opening, and are arranged parallel to the opening.

7. The testing platform of claim 6, wherein the base is made of stainless steel.

8. The testing platform of claim 1, wherein the permanent magnet is configured in a strip shape; and a length of the permanent magnet is greater than that of the model train.

9. The testing platform of claim 1, wherein the number of the permanent magnet is two, and two permanent magnets are respectively arranged on two inner sides of the gantry.

10. A testing method for evacuated tube HTS maglev using the testing platform of claim 1, comprising:

placing a field-cooling plate of a preset thickness below the cryogenic dewar of the model train;

closing the isolation door, and vacuumizing the evacuated tube to reach a preset pressure;

removing the field-cooling plate, and levitating the model train on the permanent magnet track;

energizing the mover such that under the action of electromagnetic force, the mover pushes the model train to accelerate in the evacuated tube; and when the model train arrives at an area where the gantry is located, generating, by the permanent magnet, an eddy current on the body of the model train to decelerate the model train.

\* \* \* \* \*